UNITED STATES PATENT OFFICE.

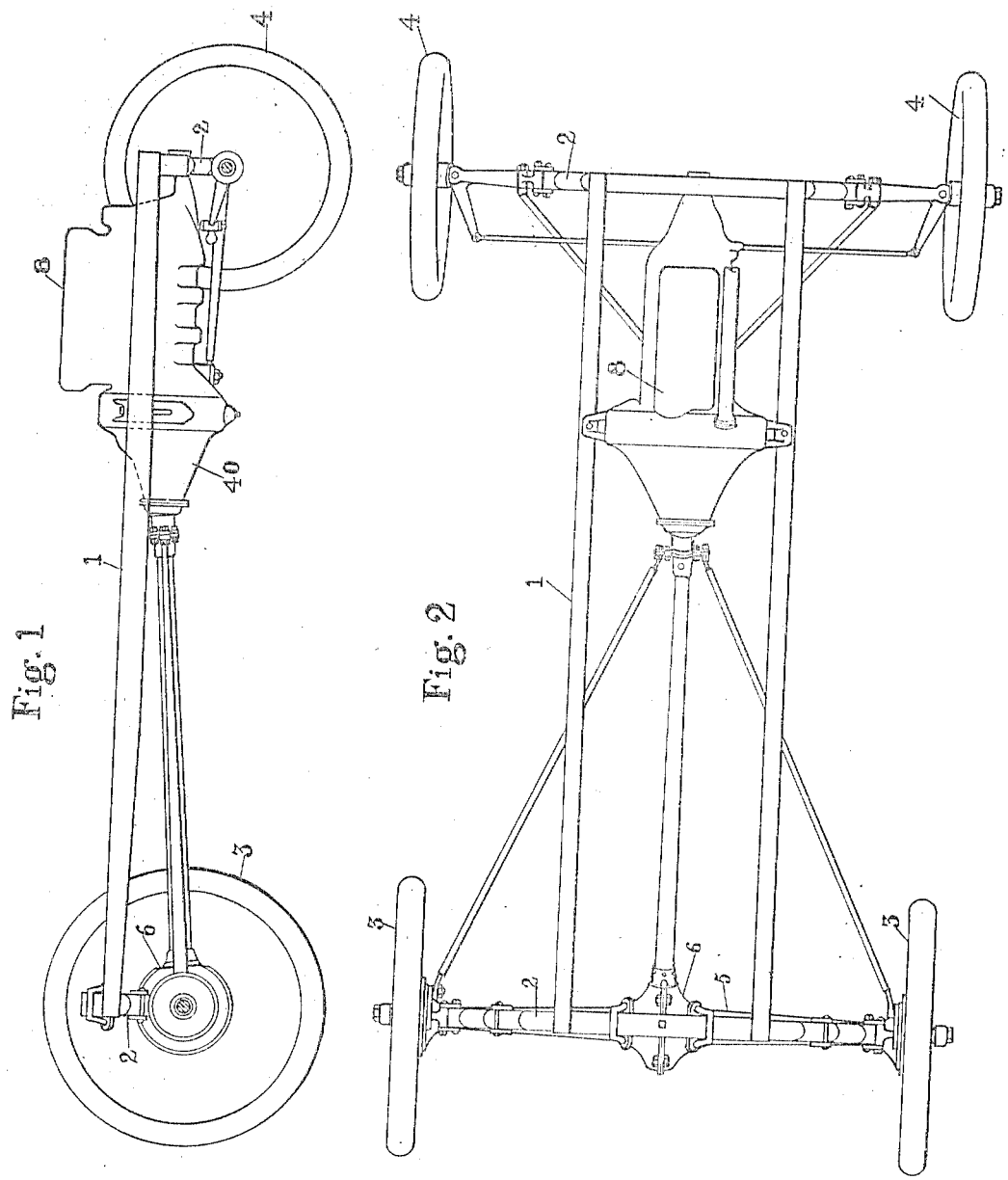

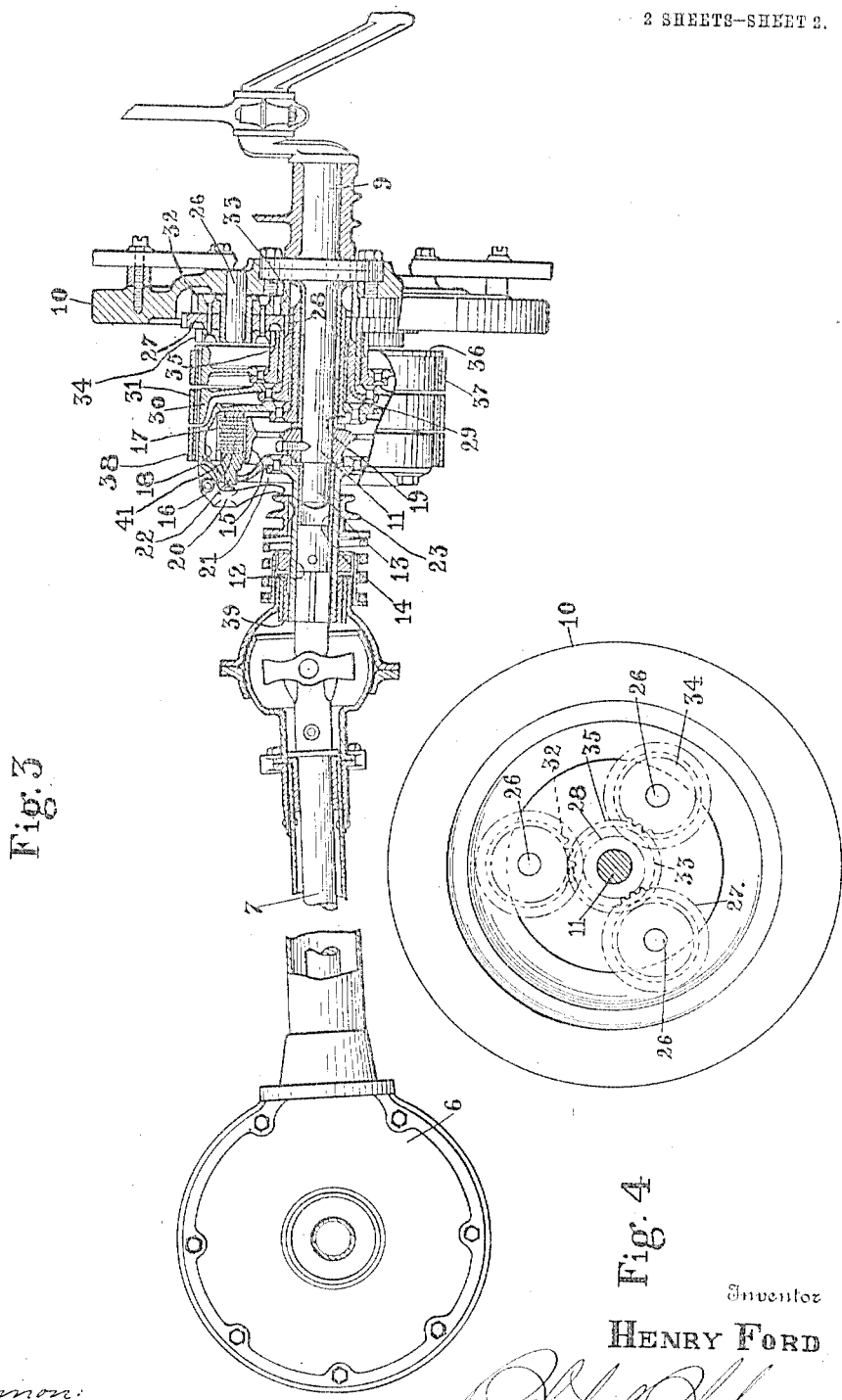

HENRY FORD, OF DETROIT, MICHIGAN.

AUTOMOBILE TRANSMISSION.

1,073,569.   Specification of Letters Patent.   Patented Sept. 16, 1913.

Application filed August 12, 1909.   Serial No. 512,503.

*To all whom it may concern:*

Be it known that I, HENRY FORD, a citizen of the United States of America, residing at Detroit, in the county of Wayne and State of Michigan, have invented certain new and useful Improvements in Automobile Transmission, of which the following is a specification, reference being had therein to the accompanying drawings.
This invention relates to automobile vehicles wherein an internal combustion motor is the propelling force. In vehicles of this type it is good practice to mount the motor upon a frame yieldingly supported on traction bearing wheels and the purpose of this invention is to provide a vehicle of this type with flexible connections between the motor and the traction wheels which permit the free oscillation of the frame upon the wheels within the range of the supporting means, and to arrange this driving connection to afford change of speed, reversal of direction, and a complete release of the motor from the traction wheels.
Another object of the invention is to dispose the parts in the most compact manner possible and to simplify the construction.

In general terms the invention comprises a rectangular frame of suitable material supported by springs upon wheels with a motor mounted on the frame and connected by means of a shaft longitudinally disposed on the frame and geared to one pair of the wheels through differential mechanism, and through a transmission train adapted to drive the shaft at a speed different from the motor speed, or through a direct connection with the motor whereby the shaft rotates in unison with the latter. The shaft has the usual flexible joints and telescoping connections desired to permit the oscillation of the frame on the wheels without disturbing or binding the driving mechanism.

To obtain the compactness of design desired, the speed changing mechanism or transmission is preferably mounted directly on the motor, and in the type herein used as illustrative of the invention, the drive gears of this mechanism are permanently secured to the fly wheel of the motor, and a clutch is used that positively locks the longitudinal shaft to the motor shaft or fly wheel independently of the transmission mechanism.

The invention consists in the matters here- inafter set forth, and more particularly pointed out in the appended claims.

In the drawings, Figure 1 is a view in side elevation, largely diagrammatic of an automobile vehicle embodying features of the invention; Fig. 2 is a plan view thereof; and Fig. 3 is a view partly in longitudinal section, of one form of change speed transmission. Fig. 4 is a view in detail of a planetary gear train.

Referring to the drawings, a frame work 1 of preferred design and material is yieldingly supported by suitable springs 2 upon a pair of traction wheels 3 and steering bearing wheels 4, the axle of the traction wheels being two-part and being journaled in a suitable sleeve 5 and being connected through the differential gear indicated at 6, which latter may be of any preferred type. The driving member of the differential is connected or geared to one end of a transmission shaft 7 disposed longitudinally of the frame with its other extremity adjacent to a motor 8 mounted on the frame. The latter, which is of any preferred internal combustion type, has a main shaft 9 disposed substantially in line with the transmission shaft 7. A fly wheel 10 is keyed, bolted, or otherwise secured on the motor shaft adjacent to the transmission shaft and is either placed a short distance from the extreme outer end of the shaft or else as herein indicated has a hub 11 forming substantially an extension of the motor shaft.

In order to secure accurate alinement of the ends of the motor and the transmission shafts without the aid of external bearings, the proximate ends of the shafts are journaled together, or as an equivalent construction, a sleeve 12 is keyed, splined, or otherwise secured to the transmission shaft and is journaled on the reduced end 13 of the fly-wheel hub, a bushing 14 being interposed if desired.

A direct connection between the transmission shaft and motor is obtained by means of a clutch which, to avoid shock when released or thrown in, is preferably of the friction type. As herein disclosed, it is of the "multiple disk" pattern. A disk drum 15 is keyed or otherwise secured to the outer end of the motor shaft, or the fly-wheel hub 11 which forms its extension, and a set of friction rings 16 are keyed or splined on the periphery thereof with a second set of disks 17 interposed alternately with them and keyed or splined to the inner periphery of an inclosing drum 18. The latter has an elongated hub or tubular spindle 19 rotatable on the motor-shaft extension or hub 11. The drum acts as a thrust bearing and by means of suitably disposed fingers 20 pivoted on a plate 21 secured to the end of the transmission shaft or sleeve 12 that bear against studs 22 on a push ring 41 which pass through the plate 21, and a clutch slide 23, the disks may be compressed and frictionally engaged so that the transmission shaft and motor shaft are locked together.

The change speed transmission between the shafts is preferably of the planetary type and may be of any desired construction. As herein indicated, the driving members of the mechanism are planetary pinions arranged in sets upon studs 26 on the face of the fly wheel 10 to rotate therewith around the hub in mesh with sun gears concentrically journaled upon the fly wheel hub 11, the fly wheel in effect forming the rotor of the train. Obviously the arrangement and dimensions of these pinions and gears may be varied or multiplied to give any desired change or relative speed. As herein indicated, a single reduction is obtained by pinions 27 on the studs meshing with a gear 28 whose extended hub 29 is rotatable on the sleeve 19 and carries at its outer end a drum 30 which may be locked against rotation in the usual manner as by a flexible encircling band 31. Intermediate pinions 32 are secured to rotate with the pinions 27 on the studs 26 in mesh with a gear 33 formed or secured on the inner end of the sleeve 19. Reversal of direction is obtained by suitably proportioned pinions 34 and secured to the pinions 27 to rotate therewith on the studs 26 in mesh with a reverse gear 35 concentrically journaled n the hub of the reduction gear. A drum 36 carried by the gear hub and conveniently adjacent to the drum 30 may be locked against rotation in the usual way as by a strap 37. A brake band 38 is applied to the drum 18.

As a further detail of construction, a bearing 39 is provided for the sleeve coupled to the transmission shaft 7 on the outer end of a casing or housing 40 which forms a combined crank and gear casing of the motor and the universal joints of the transmission shaft are beyond this bearing.

By this arrangement of parts, a very flexible driving connection between the motor and drive shaft is obtained, which permits oscillation of the spring-supported frame on the axles without binding or otherwise impeding the mechanism, which gives the range of speeds and reversal of motion required and which allows the motor to be coupled directly to the shaft independently of the change speed mechanism. The parts are compactly arranged and easily shielded from dirt and dust.

Obviously changes in details and construction may be made without departing from the spirit of the invention and I do not care to limit myself to any particular form or arrangement of parts.

What I claim as my invention is:—

1. In an automobile, traction bearing wheels, a frame yieldingly supported on the wheels, a motor on the frame, a main shaft in the motor, a transmission shaft journaled at its inner end on the outer end portion of the motor shaft, a clutch mounted on and supported wholly by the motor shaft for coupling it and the transmission shaft to rotate in unison, change speed mechanism mounted on and supported wholly by the motor main shaft and operatively connected to the transmission shaft, and operative connections between the traction bearing wheels and the outer end of the transmission shaft for driving the wheels.

2. In an automobile, traction bearing wheels, a frame yieldingly supported on the wheels, a motor supported on the frame, a main shaft on the motor, a fly wheel on the motor shaft, a transmission shaft rotatably-mounted and supported at one end on the portion of the main shaft which extends beyond the fly wheel, a clutch mounted on and supported by the fly wheel and the adjacent portions of the shafts for operatively connecting the main shaft and transmission shaft to turn in unison, change speed mechanism mounted on the fly wheel and adjacent portion of the main shaft and connected to the transmission shaft to drive the latter from the main shaft, and operative connections between the transmission shaft and the traction bearing wheels.

3. In an automobile, traction bearing wheels, a frame yieldingly-mounted on the wheels, a motor mounted on the frame, a main shaft on the motor having an extension, a fly wheel on the main shaft, a transmission shaft journaled at one end on the extension of the motor shaft, a clutch mounted on the fly wheel and adjacent portion of the transmission shaft for coupling the motor shaft and transmission shaft to rotate in unison, a change speed mechanism mounted on and supported wholly by the fly wheel and extension of the main shaft for driving the transmission shaft from the main shaft, and operative connections between the transmission shaft and the traction bearing wheels.

4. In an automobile, a pair of traction bearing wheels, a frame yieldingly supported thereon, a motor mounted on the frame, a main shaft in the motor, a fly wheel on the main shaft, an extension on the main shaft beyond the fly wheel, a transmission shaft journaled at one end on and supported by the extension of the main shaft, a clutch mechanism mounted on and supported by the fly wheel for coupling the transmission shaft to the main shaft to rotate in unison, and a change speed mechanism mounted on the fly wheel and extension and supported wholly thereby and adapted to operate the transmission shaft.

In testimony whereof I affix my signature in presence of two witnesses.

HENRY FORD.

Witnesses:
JOHN S. KEOWN,
CHARLES W. HARTMAN.